UNITED STATES PATENT OFFICE.

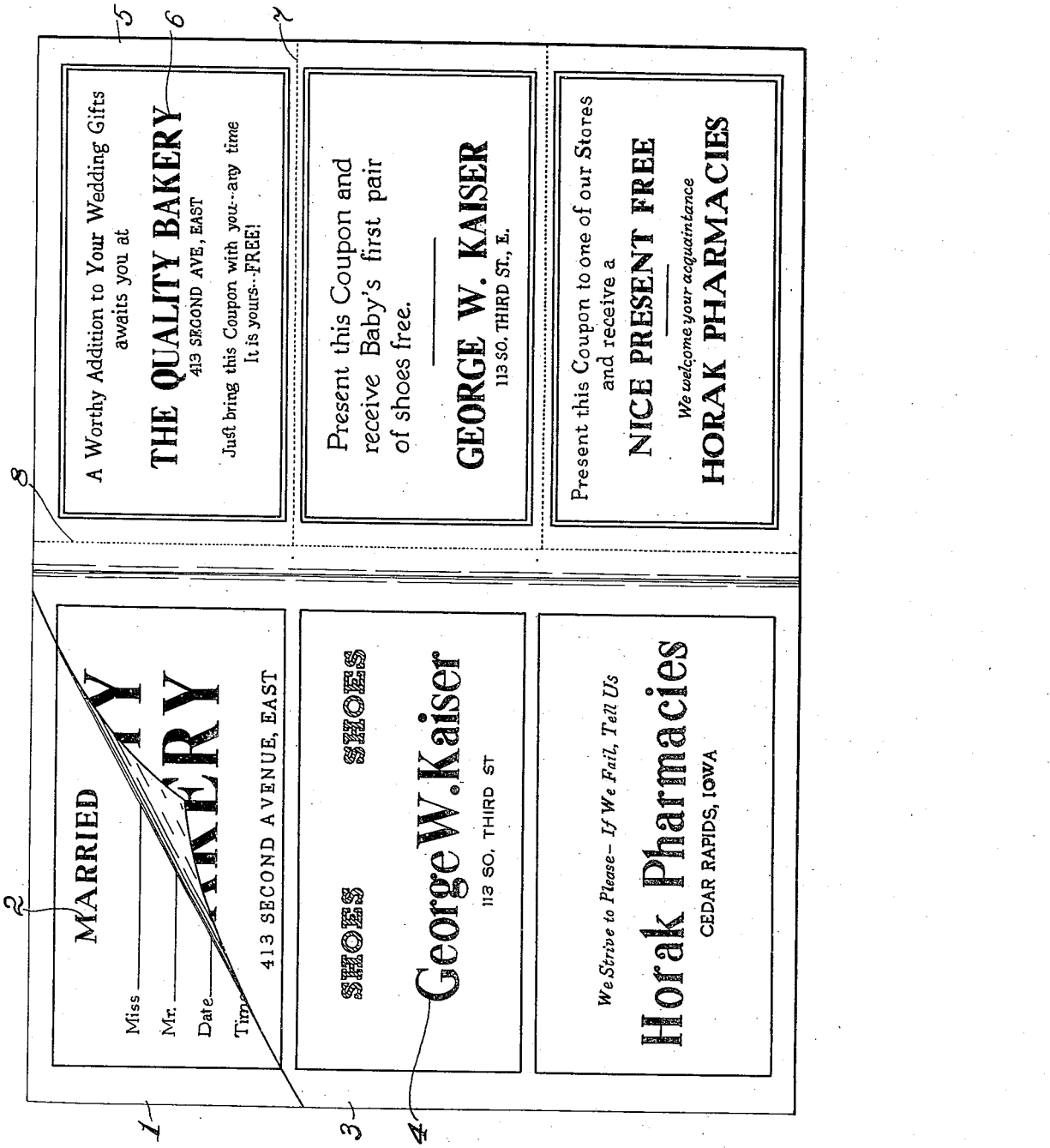

EDGAR D. LE ROY, OF WATERLOO, IOWA, ASSIGNOR TO MID-WEST PUBLISHING COMPANY, OF WATERLOO, IOWA, A COPARTNERSHIP.

COUPON ADVERTISEMENT.

1,409,348.  Specification of Letters Patent.  Patented Mar. 14, 1922.

Application filed August 3, 1921. Serial No. 489,443.

*To all whom it may concern:*

Be it known that I, EDGAR D. LE ROY, a citizen of the United States of America, and a resident of Waterloo, Black Hawk County, Iowa, have invented certain new and useful Improvements in Coupon Advertisements, of which the following is a specification.

My invention relates to improvements in coupon-advertisements, and the object of my improvements is to combine connected and related parts in booklet form, to comprise with one or more leaves containing record blanks or other matter an additional leaf or leaves containing an advertisement or advertisements together with attached separable coupons of which one or more coupons relate to and are appropriate for use with each of said advertisements.

This object I have accomplished by the means which are illustrated in the accompanying drawing, which is a plan view of the respective leaves and coupons combined, according to my invention.

The numeral 1 denotes one leaf of a booklet of which there may be one or more of these leaves containing thereon any desired information of a printed or literary character or printed blank forms for receiving family records or the like as shown at 2. These leaves 1 are bound together with one or more leaves 3 containing one or more printed advertisements 4. Also bound in the same collocation are one or more leaves 5 on which are printed coupons 6 which may be made easily separable by means of perforated rows 7.

It will be seen that coupons are provided which relate in their printed contents respectively to certain of the advertisements 4 on the leaves 3. These booklets may be donated gratis to people who will presumably preserve them permanently because of the inclusion of the record leaves 1, as filled out, and for the sake of any other useful information, such as recipes, menus, or other matter which may be printed on other like leaves not shown.

Because of this permanent advertising value conferred on the booklets which insures their preservation and frequent consultation, the coupons 6 are provided, as mnemonic means therefor which includes the feature of a concession of a gift or discount on the purchase price of goods by the dealer of the advertisement on the presentation of the coupon relating to his advertisement. This adds much to the advertising value of the booklet in the sale of the advertisements.

Having described my invention, what I claim as new, and desire to secure by Letters Patent, is:

An advertising book including a pair of leaves facing each other, one of said leaves having thereon a series of advertising spaces suitably defined from each other and each bearing a distinctive advertisement, the other of said leaves comprising a series of coupons equal in number to and substantially equal in size and shape to the advertising spaces and each positioned opposite a respective advertising space said coupons being defined from the portion of the sheet adjacent the first sheet by a line of perforations, said coupons being further defined each from the other by other lines of perforations, each of the coupons bearing matter relating to the advertisement on the first sheet opposite the respective coupon.

Signed at Waterloo, Iowa, this 2nd day of July, 1921.

EDGAR D. LE ROY.